(12) United States Patent
Kano et al.

(10) Patent No.: US 11,893,842 B2
(45) Date of Patent: Feb. 6, 2024

(54) INFORMATION PROCESSING APPARATUS, INFORMATION PROCESSING METHOD, COMPUTER-READABLE STORAGE MEDIUM, AND MOBILE TERMINAL

(71) Applicant: TOYOTA JIDOSHA KABUSHIKI KAISHA, Toyota (JP)

(72) Inventors: Hirokazu Kano, Nagoya (JP); Masatoshi Hayashi, Nisshin (JP); Reita Kamei, Nagoya (JP); Namika Hara, Kameyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 17/330,917

(22) Filed: May 26, 2021

(65) Prior Publication Data

US 2021/0375081 A1 Dec. 2, 2021

(30) Foreign Application Priority Data

Jun. 1, 2020 (JP) ................................. 2020-095690

(51) Int. Cl.
*H04W 12/30* (2021.01)
*G07C 9/00* (2020.01)
(Continued)

(52) U.S. Cl.
CPC .......... *G07C 9/00309* (2013.01); *G07C 9/22* (2020.01); *H04L 9/3234* (2013.01); *H04L 63/10* (2013.01); *G07C 2009/00769* (2013.01)

(58) Field of Classification Search
CPC .......... G07C 2009/00769; G07C 2009/00793; G07C 9/00309; G07C 9/00571; G07C 9/22; H04L 63/08; H04L 2209/76; H04L 2209/80; H04L 2209/805; H04L 63/0823; H04L 63/0876; H04L 63/102; H04L 63/12; H04L 67/1097; H04L 9/0894; H04L 9/321; H04L 9/3215; H04L 9/3218; H04L 9/3226; H04L 9/3255; H04L 9/3271; H04L 9/3273; H04L 9/3234; H04L 63/10; G06F 21/33; G06F 21/34; G06F 21/40; G06F 2221/2103; G08C 2200/00; G08C 2201/33; G08C 2201/42; G08C 2201/93; G08C 23/04;
(Continued)

(56) References Cited

U.S. PATENT DOCUMENTS

2016/0112389 A1* 4/2016 Bortolamiol ........ H04L 63/0823 726/6
2017/0187703 A1* 6/2017 Enrique Salpico ... H04L 63/162
(Continued)

FOREIGN PATENT DOCUMENTS

CN 206617017 U 11/2017
CN 107786393 A 3/2018
(Continued)

*Primary Examiner* — Dionne Pendleton
(74) *Attorney, Agent, or Firm* — Sughrue Mion, PLLC

(57) ABSTRACT

First data indicating performance of authentication that is performed by a first apparatus that performs authentication based on an electronic key acquired from a mobile apparatus is acquired, and second data including an operation command for a second apparatus is generated based on the first data, and the second data is transmitted to the second apparatus.

16 Claims, 9 Drawing Sheets

(51) Int. Cl.
*G07C 9/22* (2020.01)
*H04L 9/32* (2006.01)
*H04L 9/40* (2022.01)

(58) Field of Classification Search
CPC ...... H04N 21/42222; H04N 21/42226; H04W 12/068
See application file for complete search history.

(56) References Cited

U.S. PATENT DOCUMENTS

| | | | |
|---|---|---|---|
| 2018/0351763 A1 | 12/2018 | Ock et al. | |
| 2020/0136826 A1* | 4/2020 | Sharma | H04L 63/08 |
| 2020/0280845 A1* | 9/2020 | Mercadie | H04W 12/065 |
| 2021/0344492 A1* | 11/2021 | Goodsitt | H04L 9/3226 |

FOREIGN PATENT DOCUMENTS

| | | |
|---|---|---|
| CN | 110143175 A | 8/2019 |
| JP | 2001-112071 A | 4/2001 |
| JP | 2005-307736 A | 11/2005 |
| JP | 2015-191602 A | 11/2015 |
| JP | 2018-133062 A | 8/2018 |
| JP | 2019-505060 A | 2/2019 |

* cited by examiner

KEY DATA

| LOCKING/UNLOCKING APPARATUS ID | NAME | ELECTRONIC KEY DATA |
|---|---|---|
| L001 | HOME ENTRANCE DOOR | (Binary) |
| L002 | PASSENGER VEHICLE | (Binary) |
| L003 | OFFICE ENTRANCE DOOR | (Binary) |
| L004 | PARCEL LOCKER | (Binary) |
| ... | ... | ... |
|  |  |  |

Fig. 3

| PERFORMANCE DATA | | | |
|---|---|---|---|
| DATE/TIME | MOBILE TERMINAL | FIRST APPARATUS | ACTION |
| ... | T001 | D001 | LOCK |
| ... | T001 | D001 | UNLOCK |
| ... | T001 | D001 | LOCK |
| ... | T001 | D001 | UNLOCK |
| | | ... | ... |

Fig. 4

| COORDINATION DATA | | | | | |
|---|---|---|---|---|---|
| MOBILE TERMINAL | FIRST APPARATUS | ACTION | | SECOND APPARATUS | OPERATION COMMAND |
| T001 | D001 (HOME ENTRANCE DOOR) | LOCK | | D002 (VEHICLE) | UNLOCK |
| T001 | D002 (VEHICLE) | LOCK | | D001 (HOME ENTRANCE DOOR) | UNLOCK |
| T002 | D003 (VEHICLE) | UNLOCK | | D004 (SECURITY APPARATUS) | SWITCH TO ALERT MODE |
| T002 | D003 (VEHICLE) | LOCK | | D004 (SECURITY APPARATUS) | SWITCH TO HOME MODE |

Fig. 5

| PERFORMANCE DATA | | | | |
|---|---|---|---|---|
| DATE/TIME | MOBILE TERMINAL | FIRST APPARATUS | ACTION | POSITION INFORMATION |
| ... | T001 | D001 | LOCK | ... |
| ... | T001 | D001 | UNLOCK | ... |
| ... | T001 | D001 | LOCK | ... |
| ... | T001 | D001 | UNLOCK | ... |
| ... | T001 | | ... | ... |

INFORMATION PROCESSING APPARATUS, INFORMATION PROCESSING METHOD, COMPUTER-READABLE STORAGE MEDIUM, AND MOBILE TERMINAL

CROSS REFERENCE TO THE RELATED APPLICATION

This application claims the benefit of Japanese Patent application No. 2020-095690, filed on Jun. 1, 2020, which is hereby incorporated by reference herein in its entirety.

BACKGROUND

Technical Field

The present disclosure relates to an information processing apparatus, an information processing method, a computer-readable storage medium, and a mobile terminal.

Description of the Related Art

These days, there are more and more IoT appliances that are connected to a network. For example, the automotive field is seeing an increase in connected vehicles provided with a communication module, and also at homes, there is a sign of increase in server apparatuses that are capable of controlling indoor appliances through a network.

In relation to such circumstances, Patent Literature 1 discloses a system that enables mutual access among a plurality of devices that use different protocols.

[Patent document 1] National Publication of International Patent Application No. 2019-505060

SUMMARY

There is a demand to increase convenience of a network including a plurality of IoT appliances.

The present disclosure has been made in view the circumstances described above, and an object thereof is to coordinate devices is a network including a plurality of devices.

An information processing apparatus according to a first mode of the present disclosure includes a controller comprising at least one processor configured to:

acquire first data indicating performance of authentication that is performed by a first apparatus that performs authentication based on an electronic key acquired from a mobile apparatus, and generate second data including an operation command for a second apparatus based on the first data, and transmit the second data to the second apparatus.

An information processing method according to a second mode of the present disclosure includes:

acquiring first data indicating performance of authentication that is performed by a first apparatus that performs authentication based on an electronic key acquired from a mobile apparatus; and generating second data including an operation command for a second apparatus based on the first data, and transmitting the second data to the second apparatus.

A mobile terminal according to a third mode of the present disclosure includes:

a storage configured to store an electronic key; and a controller comprising at least one processor configured to request authentication from a first apparatus including an authentication function with the electronic key, generate first data indicating that the authentication is performed by the first apparatus, and transmit the first data to a first information processing apparatus, receive, from the first information processing apparatus, a result of issuance of an operation command for a second apparatus in response to the first data, and present the result to a user.

Furthermore, as other modes, there may be cited a program for causing a computer to perform the information processing method described above, or a non-transitory computer-readable storage medium storing the program.

According to the present invention, devices may be coordinated in a network including a plurality of devices.

BRIEF DESCRIPTION OF THE DRAWINGS

FIG. 3 is a diagram illustrating an example of key data that is generated by a server apparatus;

FIG. 4 is a diagram illustrating an example of performance data that is stored in the server apparatus;

FIG. 5 is a diagram illustrating an example of coordination data that is stored in the server apparatus;

FIGS. 7A and 7B are diagrams illustrating an example of performance data/coordination data according to a second embodiment.

DESCRIPTION OF THE EMBODIMENTS

Figure 1:
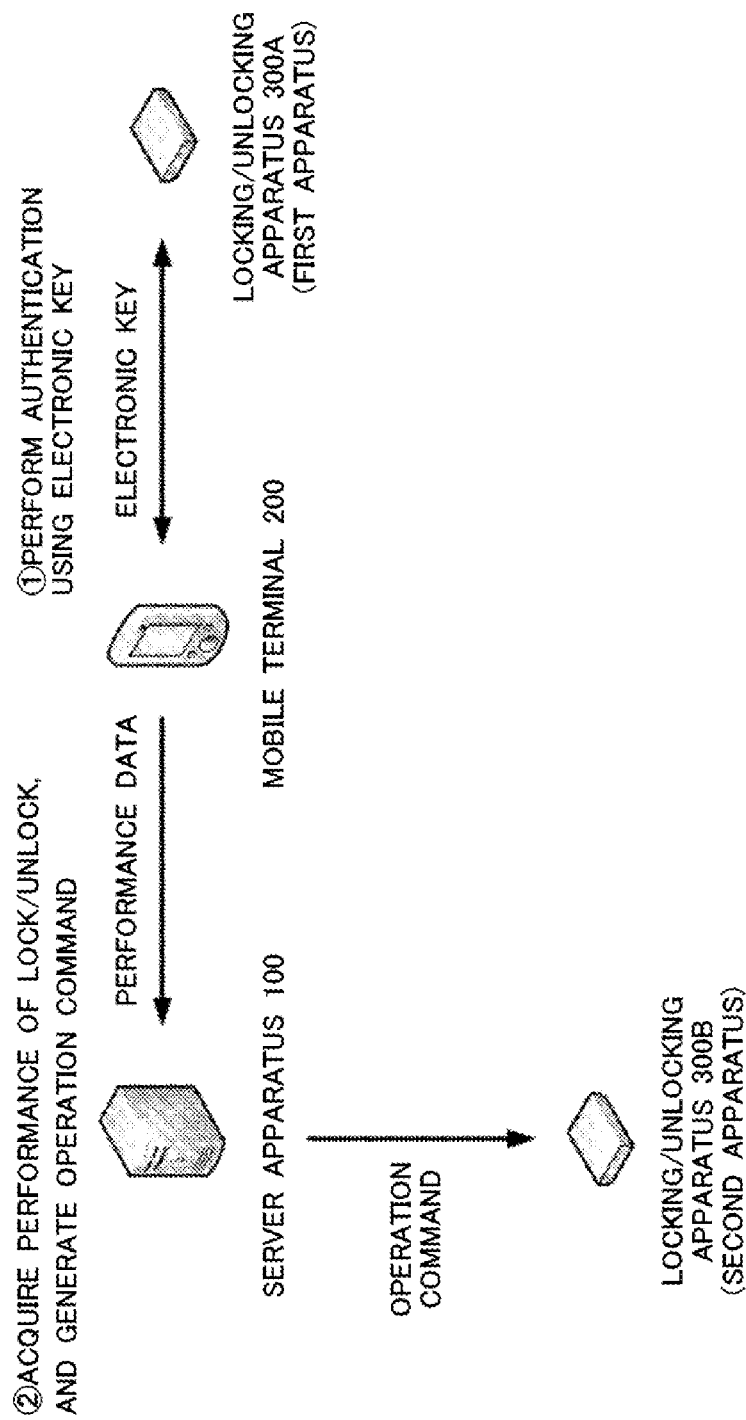
FIG. 1 is a schematic diagram of an authentication system according to a first embodiment.

An information processing apparatus according to a mode of the present disclosure is an apparatus that causes a plurality of apparatuses to coordinate with each other, based on performance of authentication performed using an electronic key.

Specifically, there is included a controller comprising at least one processor that is configured to acquire first data indicating performance of authentication that is performed by a first apparatus that performs authentication based on an electronic key acquired from a mobile apparatus, and generate second data including an operation command for a second apparatus based on the first data, and transmit the second data to the second apparatus.

The mobile apparatus is an apparatus that is to be authenticated by the first apparatus with the electronic key. The mobile apparatus may be a small computer (a mobile terminal) such as a smartphone, an IC card or the like. Furthermore, the first apparatus may be mounted on a vehicle or may be provided at a facility or a building, for example. Moreover, the first apparatus may be an apparatus that controls locking/unlocking based on as authentication result.

The first data is data indicating performance of authentication of the mobile apparatus. For example, the first data is generated in response to authentication of the mobile terminal by the first apparatus. The first data may be transmitted from the mobile apparatus, or may be transmitted from the first apparatus.

The controller generates the second data for causing the second apparatus to perform a predetermined operation, based on the first data that is acquired, and transmits the second data to the second apparatus. Additionally, it is also possible to have the second data generated only in the case of successful authentication.

According to such a configuration, when the mobile apparatus is authenticated by the first apparatus, a related apparatus (the second apparatus) may be triggered to perform a predetermined operation. That is, plurality of appliances may be made to coordinate with each other according to an action of a user.

Moreover, the information processing apparatus may further include a storage configured to store an association among the mobile apparatus, the first apparatus, and the second apparatus.

Furthermore, the first data may include a first identifier for identifying the mobile apparatus, and a second identifier for identifying the first apparatus, and the controller may determine the second apparatus to which the second data is to be transmitted, based on the first identifier and the second identifier.

When the association are stored, an appropriate apparatus may be caused to perform a process for each combination of the mobile apparatus and the first apparatus.

Moreover, the first apparatus may be an apparatus that controls locking/unlocking.

Furthermore, the first data may further include a type indicating locking or unlocking, and the controller may generate the operation command for the second apparatus based on the type.

In the case where the first apparatus is an apparatus that controls locking/unlocking, the second apparatus may be caused to perform a predetermined operation with an action of the user, such as going out or coming home, as a trigger, for example. Accordingly, for example, a vehicle associated with the user may be automatically unlocked when the user locks the entrance door.

Moreover, the controller may determine whether to generate the second data, based on a location where the authentication is performed.

According to such a configuration, processes may be performed only when the mobile apparatus is close to the second apparatus, for example. This allows the entrance door of home to be unlocked in conjunction with locking of a vehicle, but not to be unlocked in a case where the vehicle is away from home, for example.

Moreover, the controller may receive a response from the second apparatus receiving the operation command, and notify the mobile apparatus of content of the response.

When the response received from the second apparatus is transferred to the user, the user may grasp that the apparatus is reliably operated.

Moreover, one of the first apparatus and the second apparatus may be as apparatus that is installed in a vehicle, and other one may be an apparatus that is installed in a house.

According to such a configuration, a vehicle and a smart home may be coordinated. For example, an air conditioner in the vehicle may be automatically started when the user leaves the entrance door, or air conditioner at home may be automatically started when the user arrives at home.

Furthermore, home may be automatically locked when the user gets on the vehicle, or home may be automatically unlocked when the user gets off the vehicle.

Moreover, the second apparatus may be an apparatus related to security of the house, and the operation command may be a command for switching between a home mode and an away mode.

According to such a configuration, a security apparatus of the house may be activated when the user gets on the vehicle (that is, when the user leaves home), for example.

In the following, embodiments of the present disclosure will be described with reference to the drawings. Configurations of the embodiments below are merely exemplary, and the present disclosure is not limited to the configurations of the embodiments.

First Embodiment

An outline of an authentication system according to a first embodiment will be given with reference to FIG. 1. The system according to the present embodiment includes a server apparatus 100, a mobile terminal 200 possessed by a user, and a plurality of locking/unlocking apparatuses (300A, 300B, . . . ) installed at facilities (such as home, establishment, building, vehicle and the like) used by the user.

The plurality of locking/unlocking apparatuses 300 are sorted into an apparatus that interacts with the user and an apparatus that operates in conjunction with such an interaction. In the present embodiment, the former is referred to as the first apparatus (the locking/unlocking apparatus 300A), and the latter as the second apparatus (the locking/unlocking apparatus 300B).

With the system according to the present embodiment, authentication is performed between the mobile terminal 200 and the locking/unlocking apparatus 300A with an electronic key. When authentication is completed, the mobile terminal 200 transmits the result of authentication or data indicating performance (the first data; in the present embodiment, referred to as "performance data") to the server apparatus 100. The server apparatus 100 receiving the performance data transmits data including a predetermined operation command (the second data) to a second apparatus that is specified in advance.

The user may thereby cause a plurality of related apparatuses to operate, by performing one action. For example, a vehicle to be used may be automatically unlocked when the entrance door of home is locked.

Structural elements of the system will be described in detail.

Figure 2:
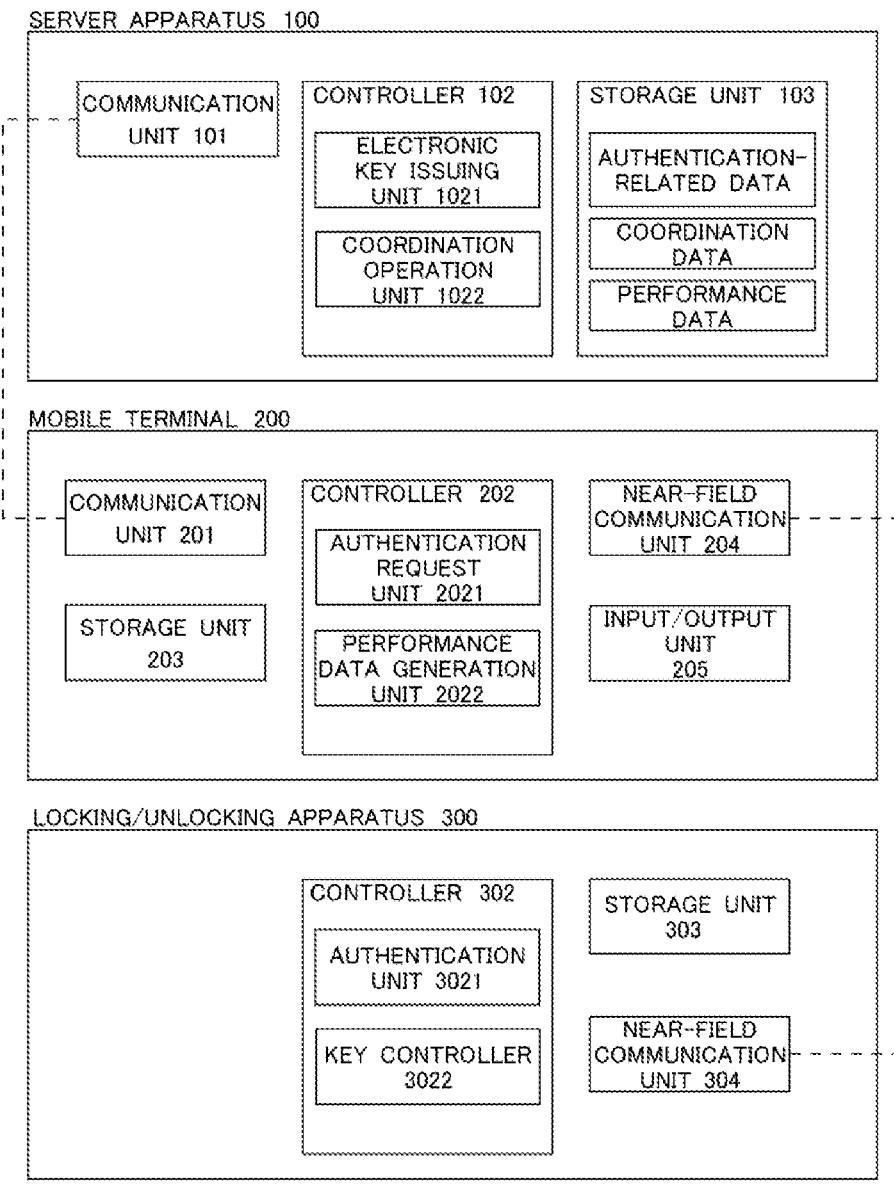
FIG. 2 is a block diagram schematically illustrating an example of structural elements included in the system.

FIG. 2 is a block diagram schematically illustrating an example of configurations of the server apparatus 100, the mobile terminal 200, and the locking/unlocking apparatus 300 illustrated in FIG. 1.

The server apparatus 100 is an apparatus that performs a process of issuing an electronic key in response to a request from the mobile terminal 200, and a process of instructing a coordinated operation between appliances based on received performance data.

The server apparatus 100 may be a general-purpose computer. That is, the server apparatus 100 may be a computer that includes processors such as a CPU and a GPU, main memories such as a RAM and a ROM, and auxiliary memories such as an EPROM, a hard disk drive and a removable medium. Additionally, the removable medium may be a USB memory or a disk recording medium such as a CD or a DVD, for example. The auxiliary memory stores an operating system (OS), various programs, various tables and the like, and a function matching a predetermined object as described below may be implemented by executing a program that is stored therein. However, one or some or all of functions may alternatively be implemented by a hardware circuit such as an ASIC or an FPGA.

The server apparatus 100 includes a communication unit 101, a controller 102, and a storage unit 103.

The communication unit 101 is communication means for connecting the server apparatus 100 to a network. In the present embodiment, the communication unit 101 is capable of communicating with other apparatuses (such as the mobile terminal 200) over a network by using a mobile communication service such as 4G or LTE.

The controller 102 is means in charge of controlling the server apparatus 100. The controller 102 is a CPU, for example.

As functional modules, the controller 102 includes an electronic key issuing unit 1021 and a coordination operation unit 1022. Each functional module may be implemented by the CPU executing a program that is stored in storage means such as a ROM.

The electronic key issuing unit 1021 issues an electronic key in response to a request from the mobile terminal 200. The electronic key is digital data for the mobile terminal 200 to be authenticated by the locking/unlocking apparatus 300.

When an issuance request for an electronic key is received from the mobile terminal 200, the electronic key issuing unit 1021 issues an electronic key corresponding to the mobile terminal 200. As the electronic key, one that is stored in advance may be acquired, or as electronic key may be dynamically generated. For example, an electronic key that is valid only in a predetermined time slot, an electronic key for which the number of times of use is specified (such as a one-time key), or an electronic key that can be used only by a predetermined mobile terminal 200 may be generated.

Additionally, in the case where the mobile terminal 200 is to access a plurality of locking/unlocking apparatuses 300, the electronic key issuing unit 1021 may issue, for the mobile terminal 200, a plurality of electronic keys for respective target locking/unlocking apparatuses 300.

FIG. 3 is a diagram illustrating data that is transmitted to the mobile terminal 200 at the time of issuance of an electronic key. As illustrated in the drawing, the electronic key issuing unit 1021 transmits, to the mobile terminal 200, key data associating an identifier of the locking/unlocking apparatus (a locking/unlocking apparatus ID), a name, and corresponding electronic key data (binary data).

The coordination operation unit 1022 performs a process of causing a plurality of locking/unlocking apparatuses 300 to operate in coordination with each other. The coordination operation unit 1022 first receives the performance data transmitted from the mobile terminal 200, and then, acquires data regarding coordination between apparatuses (coordination data) from the storage unit 103 described later and generates a command (an operation command) for causing the second apparatus to operate, based on the coordination data and the performance data that is received.

A description will be given of the performance data and the coordination data.

FIG. 4 is an example of the performance data. The performance data is data indicating performance of authentication of the mobile terminal 200 by the first apparatus (the locking/unlocking apparatus 300A). The performance data is data associating date/time, an identifier of the mobile terminal 200, an identifier of the locking/unlocking apparatus 300A as the first apparatus, and an action that is performed as a result of authentication (lock or unlock). Additionally, the performance data may also include the result of authentication (success or failure; an error code or the like in the case of failure).

FIG. 5 is an example of the coordination data. The coordination data is data associating the mobile terminal (the mobile apparatus), the first apparatus, and the second apparatus. Specifically, it is defined that, in the case where authentication succeeds between the mobile terminal 200 and the first apparatus, a predetermined operation command is transmitted to the second apparatus based on the result of authentication.

In the present example, it is defined that authentication is to be performed between a mobile terminal with an identifier "T001" and a first apparatus with an identifier "D001" (aa apparatus that controls locking/unlocking of the entrance door of home), and when "lock" is performed, a second apparatus with an identifier "D002" (an apparatus that controls locking/unlocking of a vehicle) is caused to perform "unlock" (a reference sign 501).

Accordingly, when a user locks an electronic lock of the entrance door, the door of the vehicle may, is turn, be unlocked.

Similarly, it is defined that, in the case where a first apparatus with an identifier "D002" performs 'lock', a second apparatus with an identifier "D001" is caused to perform "unlock".

Accordingly, when the user locks the vehicle, the entrance door may, in turn, be unlocked.

The storage unit 103 is means for storing information, and is a storage medium such as a RAM, a magnetic disk, a flash memory or the like. The storage unit 103 stores various programs to be executed by the controller 102, data and the like. Furthermore, the storage unit 103 stores various pieces of data for generating the electronic key (authentication-related data), and the performance data and the coordination data described above.

Next, a description will be given of the mobile terminal 200.

For example, the mobile terminal 200 is a small computer such as a smartphone, a mobile phone, a tablet terminal, a personal digital assistant or a wearable computer (such as a smartwatch). The mobile terminal 200 includes a communication unit 201, a controller 202, a storage unit 203, a near-field communication unit 204, and an input/output unit 205.

Like the communication unit 101, the communication unit 201 is a communication interface for communicating with the server apparatus 100 over a network.

The controller 202 is means for controlling the mobile terminal 200. For example, the controller 202 is a microcomputer. The controller 202 may implement functions by a CPU executing programs stored in the storage unit 203 described later.

As functional modules, the controller 202 includes as authentication request unit 2021 and a performance data generation unit 2022. Each functional module may be implemented by the CPU executing a program that is stored in storage means (such as a ROM).

The authentication request unit 2021 performs a process of acquiring an electronic key from the server apparatus 100, and a process of communicating with the locking/unlocking apparatus 300 and requesting locking/unlocking.

First, the authentication request unit 2021 performs the process of acquiring an electronic key. In the present embodiment, the server apparatus 100 generates key data including the electronic key in response to a request from the mobile terminal 200, and transmits the key data to the mobile terminal 200 through the communication unit 101.

Then, the authentication request unit 2021 presents an operation screen to the user through the input/output unit 205 described later, and generates a request for performing locking or unlocking, based on an operation performed by the user. For example, the authentication request unit 2021 outputs as icon for unlocking, an icon for locking or the like on a touch panel display, and generates data requesting locking or unlocking (a locking/unlocking request), based on an operation performed by the user.

Additionally, operation by the user is not limited to be performed through the touch panel display. For example, a hardware switch or the like may also be used.

Additionally, in the case where the mobile terminal 200 does not have the electronic key, a locking operation and an unlocking operation from the operation screen are not possible.

The electronic key to be acquired by the mobile terminal 200 may be a fixed key or a one-time key. In either case, authentication information corresponding to the electronic key is stored in advance in the locking/unlocking apparatus 300.

In the case where authentication by the locking/unlocking apparatus 300 succeeds and locking/unlocking is performed, the performance data generation unit 2022 performs a process of generating data indicating that locking/unlocking is performed (the performance data) and of transmitting the data to the server apparatus 100.

The storage unit 203 is means for storing information, and is a storage medium such as a RAM, a magnetic disk, a flash memory or the like. The storage unit 203 stores the key data transmitted from the server apparatus 100, the performance data generated by the performance data generation unit 2022, various programs to be executed by the controller 202, data and the like.

The near-field communication unit 204 is an interface for performing near-field wireless communication with the locking/unlocking apparatus 300. The near-field communication unit 204 performs communication over a short distance (of several centimeters) according to a predetermined wireless communication standard.

In the present embodiment, the near-field communication unit 204 performs data communication according to Near Field Communication (NFC) standard. Additionally, NFC is cited as an example in the present embodiment, but other wireless communication standards may also be used. For example, Bluetooth (registered trademark), Ultra Wideband (UWB), Wi-Fi (registered trademark) and the like may also be used.

The input/output unit 205 is means for receiving an input operation performed by the user, and for presenting information to the user. Specifically, a touch panel and control means thereof, or a liquid crystal display and control means thereof are used. In the present embodiment, the touch panel and the liquid crystal display are one touch panel display.

Next, a description will be given of the locking/unlocking apparatus 300.

The locking/unlocking apparatus 300 is as apparatus for locking or unlocking the door of a predetermined facility, establishment or building, and is an apparatus that forms a part of a smart key system.

The locking/unlocking apparatus 300 includes a function of performing near-field wireless communication with the mobile terminal 200 and authenticating the mobile terminal 200, and a function of locking/unlocking an electronic lock based on a result of authenticating the mobile terminal 200.

The locking/unlocking apparatus 300 includes a controller 302, a storage unit 303, and a near-field communication unit 304.

The near-field communication unit 304 is means for communicating with the mobile terminal 200 according to the same communication standard as that of the near-field communication unit 204.

The controller 302 is a module that performs control of authenticating the mobile terminal 200 by performing near-field wireless communication with the mobile terminal 200 through the near-field communication unit 304, and control of locking/unlocking as electronic lock based on the authentication result. For example, the controller 302 is a microcomputer.

As functional modules, the controller 302 includes an authentication unit 3021 and a key controller 3022. Each functional module may be implemented by a CPU executing a program that is stored in storage means (such as a ROM).

The authentication unit 3021 performs authentication of the mobile terminal 200 based on the electronic key transmitted from the mobile terminal 200. Specifically, authentication information stored in the storage unit 303 and the electronic key transmitted from the mobile terminal 200 are checked against each other, and in the case of match, authentication success is determined. In the case where the two do not match, authentication failure is determined. In the case where authentication of the mobile terminal 200 by the authentication unit 3021 succeeds, a command for performing locking/unlocking is transmitted to the key controller 3022 described later.

Additionally, a method of authentication used by the authentication unit 3021 may be a method of simply comparing and verifying identity of pieces of authentication information, or a method that uses asymmetric cryptography.

The key controller 3022 controls the electronic lock based on the command transmitted from the authentication unit 3021.

The storage unit 303 is means for storing information, and is a storage medium such as a RAM, a magnetic disk, a flash memory or the like. The storage unit 303 stores authentication information that is to be checked against the electronic key that is transmitted from the mobile terminal 200, various programs to be executed by the controller 302, data and the like.

Figure 6:
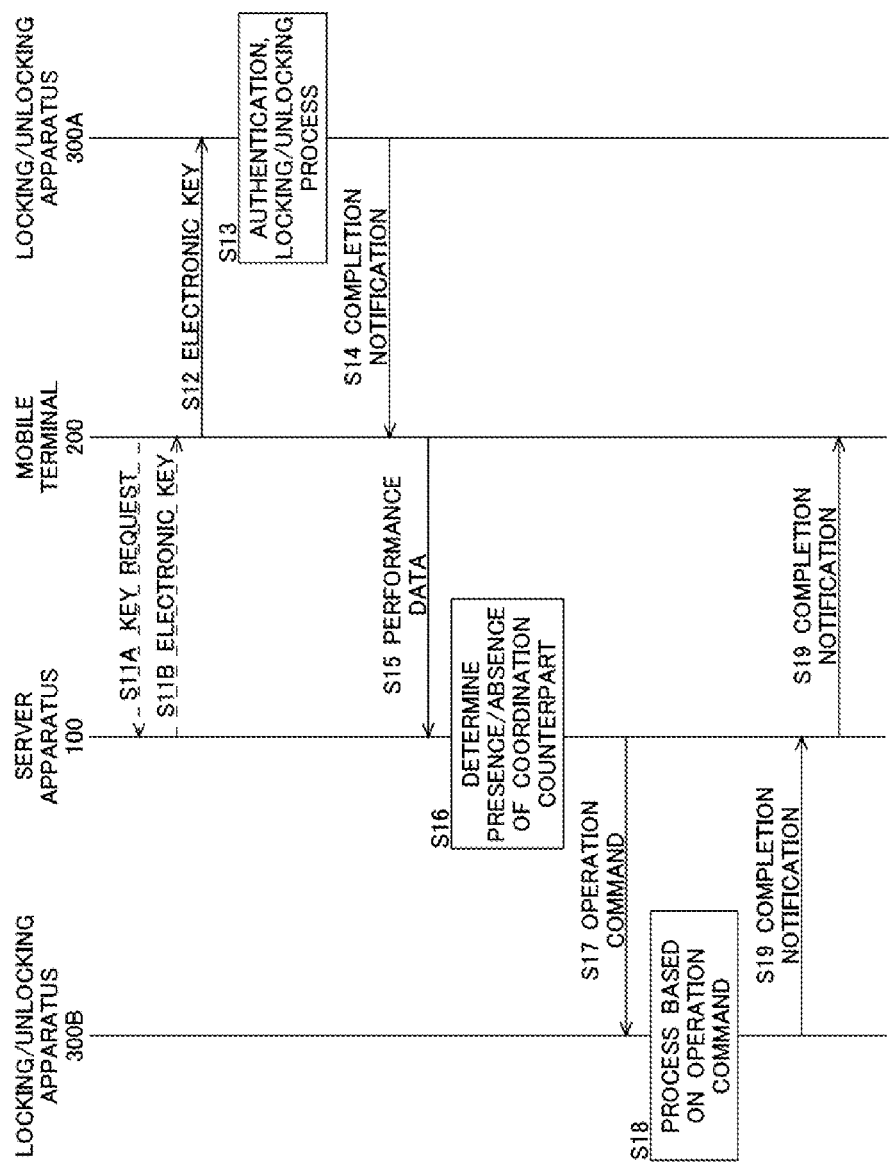
FIG. 6 is a diagram of a flow of data that is transmitted/received among structural elements.

Next, processes to be performed by the structural elements described above will be described. FIG. 6 is a diagram of a flow of data that is transmitted/received among the structural elements.

First, the mobile terminal 200 transmits data requesting issuance of an electronic key (a key request) to the server apparatus 100 (step S11A). In this step, following pieces of information are transmitted at the same time.

(1) Key request
(2) Information for identifying the mobile terminal 200
(3) Data for proving legitimacy of the mobile terminal 200

The data for proving legitimacy of the mobile terminal 200 may be a password, biometric information or the like, or may be obtained by hashing these pieces of information.

The electronic key issuing unit 1021 authenticates the mobile terminal 200, and then, generates or acquires an electronic key unique to the mobile terminal 200 and transmits the electronic key to the mobile terminal 200 (step S11B).

When the user of the mobile terminal 200 performs an operation of accessing the locking/unlocking apparatus 300A through the input/output unit 205, the mobile terminal 200 (the authentication request unit 2021) transmits the electronic key to the locking/unlocking apparatus 300A (step S12). At this time, data (the locking/unlocking request) requesting a specific process (such as locking or unlocking) may be simultaneously transmitted.

In step S13, the locking/unlocking apparatus 300A (the authentication unit 3021) performs an authentication process by checking the electronic key transmitted from the mobile terminal 200 against the authentication information that is stored in advance. Furthermore, the requested process (the locking/unlocking process) is performed in the case of successful authentication. For example, the key controller 3022 controls the electronic lock and performs locking or unlocking.

After locking or unlocking is completed, the key controller 3022 of the locking/unlocking apparatus 300A transmits a notification indicating completion of the process (a completion notification) to the mobile terminal 200 (step S14). The notification indicating completion of locking or unlocking is thus output to a touch panel screen of the mobile terminal 200. Additionally, in the case where terminal authentication information is a one-time key, the one-time key may be invalidated at this timing.

In step S15, the mobile terminal 200 generates data (the performance data) indicating the identifier of itself, the identifier of the locking/unlocking apparatus 300A, and the action (locking or unlocking) that is performed on the locking/unlocking apparatus 300A, and transmits the data to the server apparatus 100. The performance data is data indicating performance of authentication of the mobile terminal 200 by the locking/unlocking apparatus 300A. The server apparatus (the performance data collection unit 1022) stores the received performance data in the storage unit 103.

Next, in step 316, the server apparatus 100 (the coordination operation unit 1022) refers to the performance data and the coordination data, and determines whether there is an apparatus that is to be operated in conjunction. Specifically, whether there is a combination that matches the performance data among predefined combinations of the mobile terminal 200, the locking/unlocking apparatus 300A (the first apparatus) and the type of process is determined, and in the case where there is such a combination, the second apparatus and the operation that is to be performed by the second apparatus are specified. For example, in the case where the second apparatus is the locking/unlocking apparatus 3005 mounted on the vehicle and the operation to be performed is "unlock", the coordination operation unit 1022 transmits an operation command instructing unlocking to the locking/unlocking apparatus 3005 (step S17).

In the case where is no matching combination between the performance data and the coordination data, the process is ended.

The second apparatus (the locking/unlocking apparatus 300B) receiving the operation command performs a process based on the operation command (step S18). Specifically, the key controller 3022 controls the electronic lock and performs locking or unlocking.

When the process is completed, the second apparatus (the locking/unlocking apparatus 300B) transmits a notification indicating completion of the process to the server apparatus 100 (step S19). This notification is transferred to the mobile terminal 200, and is presented to the user through the input/output unit 205.

As described above, with the authentication system according to the first embodiment, in the case where a user performs locking/unlocking using the mobile terminal, a different locking/unlocking apparatus is operated in conjunction. Accordingly, when the entrance door of home is locked, the vehicle may be automatically unlocked, or when the vehicle is locked, the entrance door of home may be automatically unlocked, for example.

Second Embodiment

In the first embodiment, the server apparatus 100 generates the operation command based on the performance data and the coordination data. However, in the case where the locking/unlocking apparatus 300 is an apparatus that is mounted on a vehicle, unintended coordination is possibly caused. For example, an inconvenient situation where the entrance door of home is unlocked when the user locks the vehicle when away from home may occur.

A second embodiment is an embodiment for coping with such a situation, and is an embodiment where whether a coordinated operation is to be performed or not is determined by using position information in combination.

In the second embodiment, the mobile terminal 200 is capable of acquiring position information. The position information may be acquired through a GPS module, for example. Furthermore, in the second embodiment, the mobile terminal 200 (the performance data generation unit 2022) acquires the position information in step S15, and transmits the acquired position information to the server apparatus 100 by including the position information in the performance data.

FIG. 7A is an example of the performance data in the second embodiment. The position information (a reference sign 701) that is included in the performance data indicates the place where locking/unlocking was performed, or in other words, the place where the mobile terminal 200 transmitted the electronic key to the first apparatus.

Figure 7B:
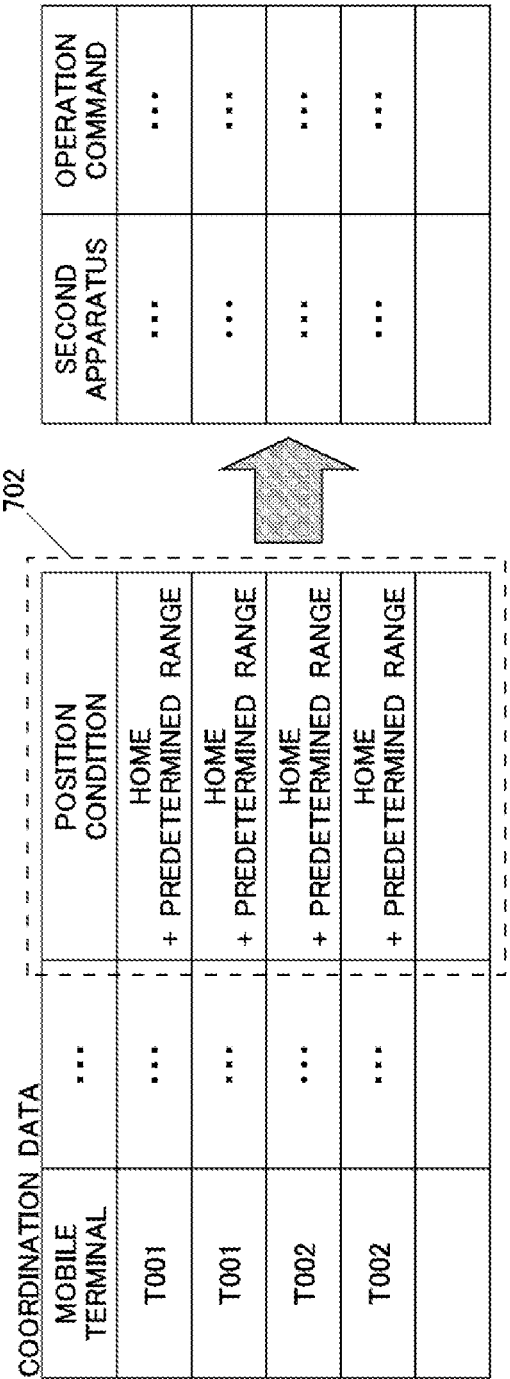

Moreover, in the second embodiment, that "the place where locking/unlocking was performed" satisfies a predetermined condition is taken as a condition for coordinated operation. FIG. 7B is an example of the coordination data in the second embodiment. In the second embodiment, a position condition (a reference sign 702) is added to the coordination data.

In the present example, the condition for the coordinated operation is that "locking/unlocking is performed within a predetermined range from home". That is, an operation command for the second apparatus is generated only in the case where performance data indicating that locking/unlocking is performed within the range mentioned above is transmitted.

For example, in step S16, the coordination operation unit 1022 compares the position condition indicated by the coordination data and the position information indicated by the performance data, and generates the operation command in the case where the conditions match.

According to the second embodiment, unintended locking/unlocking may be prevented.

Third Embodiment

In the first and second embodiments, the locking/unlocking apparatus is used as the second apparatus. In contrast, a third embodiment is an embodiment where a home security apparatus for guarding home in an unmanned manner is used as the second apparatus.

Figure 8:
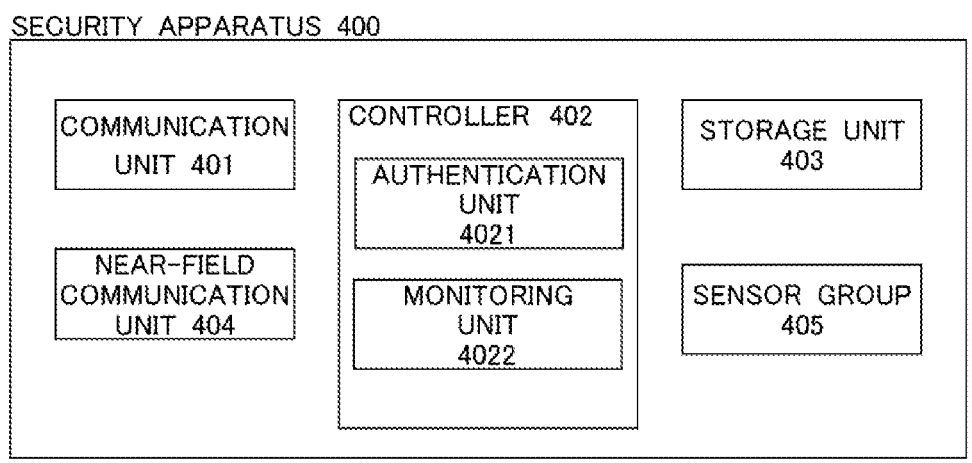
FIG. 8 is a schematic block diagram of a security apparatus according to a third embodiment.

FIG. 8 is a system configuration diagram of a home security apparatus (a security apparatus 400) that is used is the third embodiment. The security apparatus 400 includes a communication unit 401, a controller 402, a storage unit 403, a near-field communication unit 404, and a sensor group 405.

The communication unit 401, the storage unit 403, and the near-field communication unit 404 are the same as the communication unit 201, the storage unit 303, and the near-field communication unit 304, and a description thereof is omitted.

The controller 402 is a module that performs a process of guarding the inside of home in an unmanned manner by using sensors included in the sensor group 405 described later, and a process of performing authentication of the mobile terminal 200 through the near-field communication unit 404 and switching modes based on the authentication result. For example, the controller 402 is a microcomputer.

As functional modules, the controller 402 includes an authentication unit 4021 and a monitoring unit 4022. Each functional module may be implemented by a CPU executing a program that is stored in storage means (such as a ROM).

Like the authentication unit 3021, the authentication unit 4021 performs authentication of the mobile terminal 200 based on an electronic key that is acquired by near-field wireless communication.

The authentication unit 4021 switches a mode of the apparatus (hereinafter "security mode") to one of an alert mode and a home mode, based on the authentication result. In the case where the security mode is the alert mode, a security function of the monitoring unit 4022 described later is activated, and unmanned guarding of the inside of home is performed by sensors. In the case where the security mode is the home mode, the security function is deactivated.

In the case where the security mode is the alert mode, the monitoring unit 4022 guards the inside of home using a plurality of sensors included in the sensor group 405. Specifically, presence/absence of a person inside home is monitored, and an alarm is generated or a relevant organization is alerted as necessary.

The sensor group 405 includes a plurality of sensors that are installed inside home. Any type of sensors may be used as the plurality of sensors as long as a person inside home may be detected. For example, an infrared sensor, a door open/close sensor, an image sensor and the like may be used. The result of sensing is transmitted to the monitoring unit 4022.

In the present embodiment, the security apparatus 400 is used as the second apparatus. Rows indicated by a reference sign 502 in FIG. 5 are examples of the coordination data used in the present embodiment.

In the case where the first apparatus is the locking/unlocking apparatus that is mounted on a vehicle and the type of process is "unlock", as in the example illustrated, an operation command instructing switching to the alert mode is transmitted to the security apparatus 400 as the second apparatus. Furthermore, in the case where the type of process is "lock", an operation command instructing switching to the home mode is transmitted to the security apparatus 400 as the second apparatus.

The data flow in the present embodiment is the same as that illustrated in FIG. 6 except that the second apparatus is the security apparatus 400.

The security apparatus 400 (the monitoring unit 4022) receiving an operation command switches to a specified mode based on the operation command.

When switching is completed, the security apparatus 400 transmits a notification indicating completion of the process to the server apparatus 100. This notification is transferred to the mobile terminal 200, and is presented to the user through the input/output unit 205. The user may thus grasp that the home mode is switched to the alert mode or that the alert mode is switched to the home mode.

Additionally, in the present embodiment, the first apparatus is the locking/unlocking apparatus that is mounted on a vehicle, and the second apparatus is the security apparatus. That is, the mode of the security apparatus is switched with locking/unlocking of the vehicle as a trigger, but alternatively, the first apparatus may be the security apparatus, and the second apparatus may be the locking/unlocking apparatus that is mounted on the vehicle. That is, the vehicle may be locked or unlocked with switching of the mode of the security apparatus as a trigger.

For example, in the case where the apparatus is switched from the home mode to the alert mode by the user, an operation command for unlocking the vehicle may be transmitted to the second apparatus (for example, the locking/unlocking apparatus 300B mounted on the vehicle). Furthermore, in the case where the apparatus is switched to the home mode by the user, an operation command for locking the vehicle may be transmitted to the second apparatus (the locking/unlocking apparatus 3001).

Moreover, in the present embodiment, the first apparatus is the locking/unlocking apparatus that is mounted on a vehicle, but the first apparatus may alternatively be a locking/unlocking apparatus that is installed at home. According to such a mode, the mode of the security apparatus may be automatically switched in conjunction with locking/unlocking of the entrance door.

MODIFICATIONS

The embodiments described above are merely examples, and the present invention may be changed as appropriate within the scope of the present invention.

For example, the processes and means described in the present disclosure may be freely combined as long as no technical conflict occurs.

Furthermore, in the description of the embodiments, the first apparatus is a locking/unlocking apparatus, but the first apparatus is not limited to an apparatus that controls locking/unlocking as long as a function of authenticating the mobile terminal 200 is included. For example, an apparatus that manages entry/exit or other apparatuses may also be used.

Furthermore, the first apparatus may be a vehicle or an on-board apparatus. For example, the first apparatus may be an apparatus that controls ignition or a main power of a vehicle based on a result of authenticating a user. In this case, for example, an operation command for the second apparatus may be generated with start of an engine of the vehicle or turning on of power as a trigger. In the same manner, an operation command for the second apparatus may be generated with stopping of the engine of the vehicle or shutting down of the system as a trigger.

Furthermore, other conditions may be further added in relation to generation of an operation command for the second apparatus. For example, an operation command may be generated when a vehicle that authenticated a user leaves a predetermined location. The security apparatus at home may thus be switched to the alert mode when the vehicle leaves home, for example.

Furthermore, in the description of the embodiments, the server apparatus 100 receives the performance data from the mobile terminal 200, but the transmission source of the data does not have to be the mobile terminal as long as data indicating that authentication is performed with an electronic key can be acquired. For example, the second apparatus may generate and transmit the performance data.

Furthermore, in the description of the embodiments, the second apparatus is a single apparatus, but a plurality of apparatuses may be specified as the second apparatus. For example, both a locking/unlocking apparatus installed at the entrance door of home and a home security apparatus may be specified as the second apparatus. In this case, both "locking/unlocking of the entrance door" and "switching of the security mode" may be performed in conjunction with the first apparatus, for example.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the above embodiments to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Bio-ray discs, etc.), and any type of medium suitable for storing electronic instructions such as read-only memories (ROMs), random access memories (RAMs), EPROMs, EEPROMs, magnetic cards, flash memories, and optical cards.

What is claimed is:

1. An information processing apparatus comprising a controller comprising at least one processor configured to:
    acquire first data indicating performance of authentication that is performed by a first apparatus that performs authentication based on an electronic key acquired from a mobile apparatus, and
    generate second data including an operation command for a second apparatus based on the first data, and transmit the second data to the second apparatus, and
    further comprising a storage configured to store an association among the mobile apparatus, the first apparatus, and the second apparatus,
    the first data includes a first identifier for identifying the mobile apparatus, and a second identifier for identifying the first apparatus, and
    the controller determines the second apparatus to which the second data is to be transmitted, based on the first identifier and the second identifier.

2. The information processing apparatus according to claim 1, wherein the first apparatus is an apparatus that controls locking/unlocking.

3. The information processing apparatus according to claim 2, wherein
    the first data further includes a type indicating locking or unlocking, and
    the controller generates the operation command for the second apparatus based on the type.

4. The information processing apparatus according to claim 1, wherein the controller determines whether to generate the second data, based on a location where the authentication is performed.

5. The information processing apparatus according to claim 1, wherein the controller receives a response from the second apparatus receiving the operation command, and notifies the mobile apparatus of content of the response.

6. The information processing apparatus according to claim 1, wherein one of the first apparatus and the second apparatus is an apparatus that is installed in a vehicle, and other one is an apparatus that is installed in a house.

7. The information processing apparatus according to claim 6, wherein
    the second apparatus is an apparatus related to security of the house, and
    the operation command is a command for switching between a home mode and an away mode.

8. The information processing apparatus according to claim 1, wherein the first data is transmitted from the mobile apparatus.

9. An information processing method comprising:
    acquiring first data indicating performance of authentication that is performed by a first apparatus that performs authentication based on an electronic key acquired from a mobile apparatus;
    generating second data including an operation command for a second apparatus based on the first data, and transmitting the second data to the second apparatus; and
    acquiring an association among the mobile apparatus, the first apparatus, and the second apparatus,
    the first data includes a first identifier for identifying the mobile apparatus, and a second identifier for identifying the first apparatus, and
    the second apparatus to which the second data is to be transmitted is determined based on the first identifier and the second identifier.

10. The information processing method according to claim 9, wherein the first apparatus is an apparatus that controls locking/unlocking.

11. The information processing method according to claim 10, wherein
    the first data further includes a type indicating locking or unlocking, and
    the operation command for the second apparatus is generated based on the type.

12. The information processing method according to claim 9, wherein whether to generate the second data is determined based on a location where the authentication is performed.

13. The information processing method according to claim 9, wherein a response is received from the second apparatus receiving the operation command, and the mobile apparatus is notified of content of the response.

14. The information processing method according to claim 9, wherein one of the first apparatus and the second apparatus is an apparatus that is installed in a vehicle, and other one is an apparatus that is installed in a house.

15. A non-transitory computer-readable storage medium with a program stored therein for causing a computer to perform the information processing method according to claim 9.

16. A mobile terminal comprising:
    a storage configured to store an electronic key; and
    a controller comprising at least one processor configured to
    request authentication from a first apparatus including an authentication function with the electronic key,
    generate first data indicating that the authentication is performed by the first apparatus and including a first identifier for identifying the mobile terminal, and a second identifier for identifying the first apparatus, and transmit the first data to a first information processing apparatus, receive, from the first information processing apparatus which acquires an association among the mobile terminal, the first apparatus, and a second apparatus and determines the second apparatus to which second data is to be transmitted, based on the first identifier and the second identifier, the second data comprising a result of issuance of an operation command for the second apparatus in response to the first data, and present the result to a user.

\* \* \* \* \*